United States Patent
Boudreau

(10) Patent No.: US 11,023,852 B2
(45) Date of Patent: Jun. 1, 2021

(54) AUTOMATED MATERIAL INVENTORY AND DELIVERY SYSTEM FOR UNDERGROUND MINES

(71) Applicant: FORTAI Tech Ltd., Sudbury (CA)

(72) Inventor: Marc Boudreau, Sudbury (CA)

(73) Assignee: FORTAI TECH LTD., Sudbury (CA)

( * ) Notice: Subject to any disclaimer, the term of this patent is extended or adjusted under 35 U.S.C. 154(b) by 114 days.

(21) Appl. No.: 16/465,556

(22) PCT Filed: Jan. 17, 2018

(86) PCT No.: PCT/CA2018/050045
§ 371 (c)(1),
(2) Date: May 30, 2019

(87) PCT Pub. No.: WO2018/132904
PCT Pub. Date: Jul. 26, 2018

(65) Prior Publication Data
US 2020/0356942 A1 Nov. 12, 2020

Related U.S. Application Data

(60) Provisional application No. 62/447,168, filed on Jan. 17, 2017.

(51) Int. Cl.
*G06Q 10/08* (2012.01)
*G06Q 10/06* (2012.01)

(52) U.S. Cl.
CPC ....... *G06Q 10/087* (2013.01); *G06Q 10/0631* (2013.01)

(58) Field of Classification Search
CPC ....... E21C 41/16; E02F 9/2054; G06Q 50/02; G06Q 10/087
See application file for complete search history.

(56) References Cited

U.S. PATENT DOCUMENTS 4,492,504 A 1/1985 Hainsworth
4,989,695 A * 2/1991 Kubo ................ B66B 1/18
187/247

(Continued)

FOREIGN PATENT DOCUMENTS

CN 105427078 A 3/2016

OTHER PUBLICATIONS

Arthur Hoskin, "A Study of Skip Hoisting at Illinois Coal Mines", Aug. 17, 1925, University of Illinois Bulletin, vol. XXII, No. 51, p. 16 (Year: 1925).*

(Continued)

*Primary Examiner* — A. Hunter Wilder
(74) *Attorney, Agent, or Firm* — Hoffman Warnick LLC

(57) ABSTRACT

The invention discloses an automated material inventory and delivery system for underground mines using a shaft and hoist transporting material from the surface to working areas. The system includes means for automatically and paperless processing orders for supplies from a plurality of locations within the mine. The system communicates to client through a plurality of terminals located throughout the mine and tracks material received, stored and distributed using electronic inventory tracking means. Loading and unloading of material into and out of the cage is automatic and includes automatic guided vehicle means to gather the ordered material and deliver to the cage. The system includes means whereby consumable supplies are autonomously delivered to a working area to ensure sufficient material is on hand to meet production targets. Ore may be transported to the surface using the cage and ore containers, optimizing the use of the hoist and increasing mine production.

6 Claims, 2 Drawing Sheets

(56) References Cited

U.S. PATENT DOCUMENTS

| | | |
|---|---|---|
| 6,341,271 B1 | 1/2002 | Salvo et al. |
| 2012/0101627 A1 | 4/2012 | Lert |
| 2015/0156605 A1 | 6/2015 | Skaaksrud et al. |
| 2016/0217535 A1* | 7/2016 | Kodama ................. E21F 13/00 |
| 2016/0342915 A1 | 11/2016 | Humphrey |
| 2017/0032302 A1* | 2/2017 | Lete ................. G06Q 10/06313 |
| 2018/0354412 A1* | 12/2018 | Ogihara ................. G01C 21/20 |

OTHER PUBLICATIONS

PCT International Search Report and Written Opinion for International Application No. PCT/CA2018/050045, dated Apr. 23, 2018, 10 pages.

Stefan Sjotrom, "ABB Underground Mining Mobile Integrations," SEABB, PAPI UGM Automation, ABB Group, May 18, 2015, 28 pages.

* cited by examiner

AUTOMATED MATERIAL INVENTORY AND DELIVERY SYSTEM FOR UNDERGROUND MINES

FIELD OF THE INVENTION

This invention relates to supply chain automation, material handling systems, and more particularly, it relates to an automated material inventory and delivery system for underground mines having shafts and hoists.

BACKGROUND OF THE INVENTION

One of the most complex activities in underground mine operations where a shaft and hoist are used is material handling and supply, that is, moving consumable materials and workers from ground surface to working areas of the mine and moving ore from the working areas of the mine to ground surface for further processing.

Due to the enormous costs involved in sinking a mine shaft, particularly in mines with hard rock formations, most mines comprise a single shaft which could be sunk thousands of feet into the heart of a productive ore body. Within the shaft is an elevating device called a "hoist". However, a person skilled in the art would understand that different names for "hoist" may be used. For example, when a "hoist" is used to move ore from underground to the surface of the mine, it is called a "skip". When a "hoist" is used to move workers and materials, it is called a "cage". In some configurations of hoist, the skip and cage may be joined in tandem or stacked against each other.

With multiple working levels in a mine, optimizing the movement and cargo of the cage requires accurate coordination between moving workers and consumables into the mine and moving raw ore out.

Mine production efficiency, and consequently its profitability, is therefore heavily dependent upon maximizing the amount of ore brought to the surface for further processing and refinement. Therefore, the cage often represents a production "bottleneck" in mining operations.

Typically, the process of managing consumable materials, inventory and delivery involve the following steps:

First, the amount of consumable material and inventory needed to complete short term and long term tasks is calculated and assessed based on current data; and a plan is developed.

After developing the plan, one schedules the required materials into Enterprise Resource Planning (or ERP) software, which obtains quotes from suppliers and arranges for delivery. The process of planning, procuring, and delivering material can range from days to weeks.

Once a supplier and/or purchase orders have been accepted, the required materials are delivered to the mine site. Most materials are then sent underground and other items such as critical spare parts are stocked and stored in a large surface warehouse where it will be stocked until it needs to be used.

In the large surface warehouse, supplies are often left on shelves for months, taking up valuable space and incurring large carrying costs. Inventory can also become lost or forgotten.

When a material is called upon for distribution, it is loaded onto a skid and the cage tenderer moves the skid onto the cage with a forklift, winch or tugger. Often, the delivery will be delayed because of blasting or the cage is in use.

Once the cage is available, the cage tender puts the skid of material into the cage and it is sent underground.

Once underground, the skid is left on the side or designated lay down area where it will be picked up later to deliver the material to its destination.

The final destination could be a working face, an underground maintenance garage, or the location of a failed or defective equipment within the mine workings.

Because material movement is managed and tracked manually, delivery of material to the intended work location is not always guaranteed.

Furthermore, because material inventory is often overestimated it creates waste which is left in the mine and discarded when the worker finishes their task.

The mining industry is often referred to as "cyclical" in nature; therefore, reducing costs of mine operations is extremely important to ensure that a mine is able to remain profitable during the ups and downs of the metal markets. This is particularly true for mines extracting ores of marginal grades. A system which can optimize the movement of the cage so to maximize ore production and delivery by the skip is desired.

There are a number of systems directed at material-handling that have been known, however, they are either not directed to mining systems per se, or have shortcomings as described herein below.

For example, U.S. Pat. No. 5,758,329 entitled "System for Managing Customer Orders and Method of Implementation" to Wajcik et al. discloses a system of inventory management whereby customer orders are received in real-time and then forwarded to the appropriate authority for execution. While this invention may streamline the administration of an order and delivery system, it does not address the issue of optimizing cage utilization in a mine shaft and would not be adaptable to a mine.

U.S. Pat. No. 5,720,363 entitled "System and Method for Automatic Ordering and Direct Underground Distribution of Articles to Customers" to Kipp discloses a shopping system whereby a client may place an order for an article, have the order processed automatically and then have the article delivered automatically via an underground network of tunnels. This invention functions best when operating in two dimensions. However, it would not be suitable for a three-dimensional mining operation where all deliveries of articles must be made to the client through a single cage and then transported to great depths.

U.S. Pat. No. 4,492,504 entitled "Materials Handling System" to Hainsworth discloses a system that uses an unmanned guided vehicle to receive material from a storage area, transport it to a selected destination and then deposit the material in a predetermined location. This invention is adaptable to manufacturing and warehouse applications, however, it would not be suitable for underground mining operations as it does not have the storage capacity or dimensions to handle the large components that must be transported into a mine. As well, the invention would not be suitable for outdoors operation over a rough surface. Furthermore, the invention would require a number of trips to and from the inventory storage area to load large quantities of materials into a cage. In the result, if this invention were to be used in a mining context, unproductive cage time would increase.

There are also a number of known systems directed at vehicle logistics, and vehicle dispatch.

For example, Chinese Patent Application 105427078 (A) entitled "Underground coal mine aided transport logistics information management system" to SHANDONG XINJULONG ENERGY CO LTD discloses a system which manages the transportation and delivery of materials in a coal mine through virtualized inventory database(s). The database(s) are updated by a supplementary process which requires a stage gate trigger events which append the database records to reflect the location and condition of the subject material. For example, in order for the virtualized warehouse to reflect that an item has been delivered to its intended user, a barcode affixed to the material must be scanned by a barcode scanner and presumably with a human operator. While the system may provide a means for the tracking of equipment and materials, it does so by necessitating the use of barcode scanners by mine personnel. For a system with passive tracking of uncontrolled material distribution such like this, in order to provide up to the minute material state data, it will need human intervention, which will add costs to mine operation.

US Patent Application No. 20140094999A1 entitled "Vehicle dispatching method and system" to Autonomous Solutions, Inc. discloses a system for the dispatch of vehicles according to an optimized schedule. Although this invention may facilitate the dispatch and single point guidance of a vehicle, it is not suitable for the mining environment because it does not account for the dynamic and changing conditions of a mine. For example, this invention does not make accommodations for the avoidance of other onsite vehicle traffic or for the avoidance of flooded areas of the mine. Also, the invention does not integrate material management or material management systems in order to guide vehicles for the delivery of materials.

United Patent Application No. 2016342915A1 to Caterpillar Inc. discloses a system for the management of autonomous vehicles to efficiently distribute vehicles to service locations based on demand. This system does not apply itself directly to material distribution or material management. Furthermore, this system does not integrate with other systems in the mine, for example, mine conveyance, and therefore does not synchronize material distribution with other mine systems.

United Patent Application No. 20150170109A1 discloses a conveyor belt life cycle management system in which the system strives to maintain minimum quantities of belts for replacement. This system does not integrate with the other systems of a mine and does not address just in time delivery of components to the end user.

There are also known computerized inventory management systems.

For example, U.S. Pat. No. 6,341,271 to General Electric Company discloses a system of inventory management, which automatically monitors inventory amounts, provides information concerning inventory, and decides if an order for replacement inventory should be placed. Although the system may provide the means for the tracking of inventory and projection of demand, it does not integrate the means for delivery of materials underground.

It is clear that, although various systems have been proposed to optimize the ordering and delivery of articles, the known systems have a variety of drawbacks if they were adapted to underground mining operations in mines using a single shaft and cage elevating system, among which:
a. the inability to reduce inventory carrying costs;
b. the inability to minimize inventory during periods when the mine is shut down;
c. the inability to reduce manpower costs in loading and unloading mine consumables on the surface and underground;
d. the inability to optimize cage usage; and
e. the inability to load a large volume cage in an efficient manner.

Therefore, there remains the need for a cost effective, streamlined, automated material inventory and delivery system for underground mines having shafts and hoists which would remove manual intervention, and achieve just-in-time delivery of consumables to their intended destination.

SUMMARY OF THE INVENTION

According to one aspect of the invention, there is provided an automated material inventory and delivery system for underground mines with shaft and hoist elevating means, said system comprising:
a. means for placing orders for a consumable material including means for processing said orders;
b. means for receiving the consumable material from a plurality of suppliers;
c. means for electronically identifying the material received from said suppliers;
d. means for automatically unloading the consumable material supplied by the suppliers and storing the consumable material in a warehouse;
e. means for automatic inventory tracking of the consumable material;
f. means for dispatching at least one payload autonomous carriers (PACs) to said warehouse to collect the ordered consumable material and deliver said ordered consumable material to a mine cage;
g. means for automatically loading and unloading the mine cage, said means include means for controlling mine cage operation during loading and unloading and automatic material handling means to receive the consumable ordered material and place said ordered consumable material in the mine cage;
h. means for unloading said ordered consumable material from the mine cage; and
i. means for autonomously delivering the ordered consumable material to a predetermined working area of the mine.

According to another aspect of the invention, there is provided a container for delivering ordered consumable material in a mine, wherein the ordered consumable material is placed inside of said container for transport during delivery to a predetermined working area of the mine, said container is equipped with tagging means to track the ordered consumable material through the delivery process.

Other features and advantages of the present invention will become apparent from the following detailed description and the accompanying drawings, which illustrate, by way of example, the principles of the invention.

BRIEF DESCRIPTION OF THE DRAWINGS

The invention will now be described with reference to the drawings, in which.

DETAILED DESCRIPTION OF THE INVENTION

The present invention is better illustrated in comparison with the current existing methodology of material delivery in mines.

Figure 1:
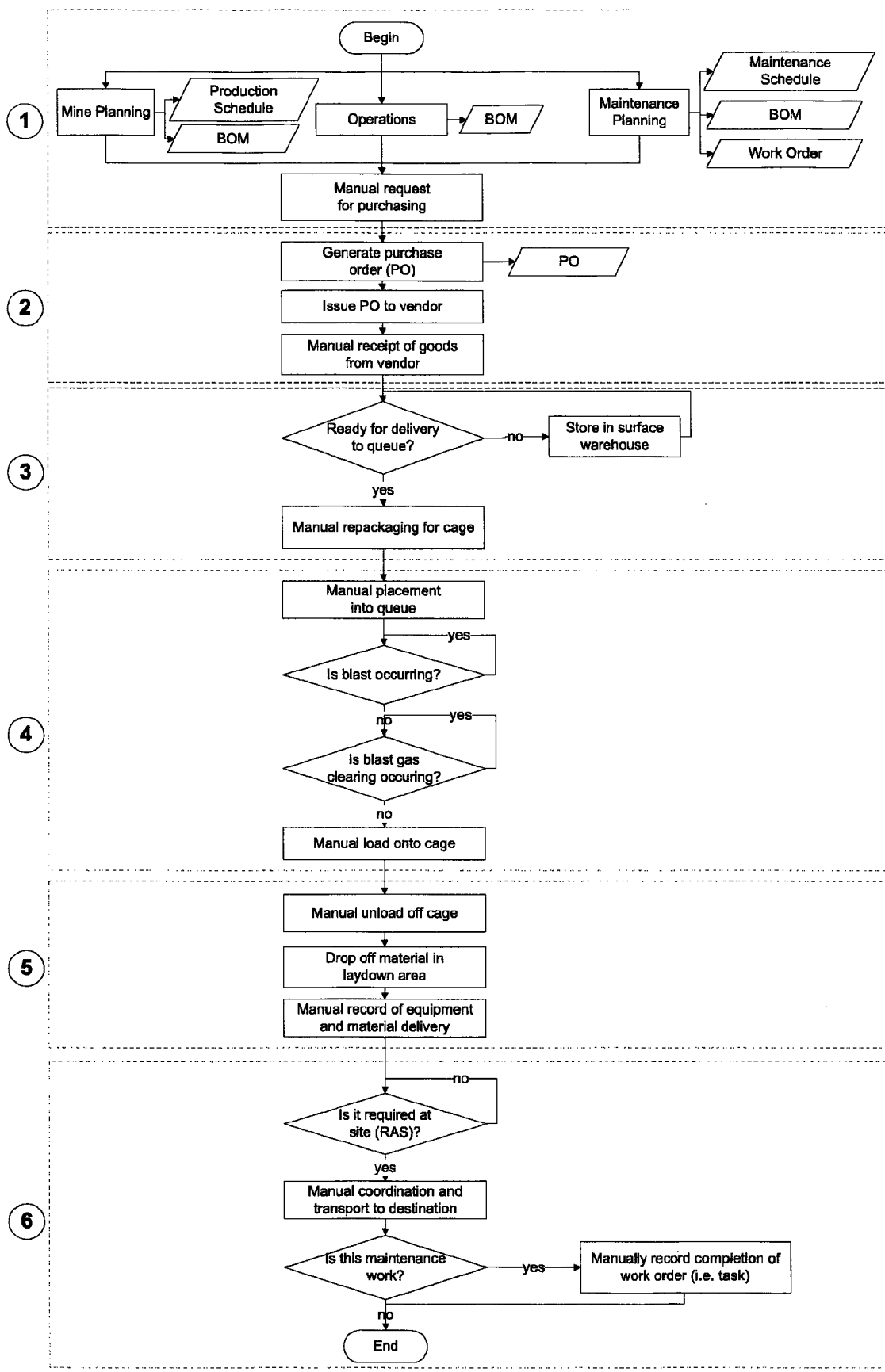
FIG. 1 shows the flowchart of the prior art material delivery methodology.

FIG. 1 shows the flowchart of prior art methodology of material delivery in mines:

Stage (1): An official request for equipment, components or consumables is generated by the Planning, Maintenance or Operations department, including planning of production schedule, bill of materials (BOM) and maintenance planning. A record of the request is registered in a database software often referred to as an ERP (Enterprise Resource Planning). The ERP software facilitates the workflows to initiate the procurement of the materials and scheduling of work in the corresponding maintenance or operations schedule.

Stage (2): The procurement department generates and issues a purchase order to the appropriate vendor. The vendor then prepares the shipment by packaging the materials for shipment to the client site by surface transportation (e.g. trucks on public highways). Once materials arrive on the client site, it is unloaded from the trucks by mine personnel utilizing mobile equipment and deposited in a surface staging area. In the event that the material is in immediate demand it may be placed directly into cage queue. Surface staging areas range from: warehouses, cold storage facilities, lay down areas and inside the head frame directly adjacent to the cage. A packing slip is included in the shipment which is used to reconcile the surface inventory database.

Stage (3): Most underground mines rely on mine conveyance, or the "cage" to transport materials to underground levels from surface. Mobile equipment, rail cars and air hoists are used to manipulate materials into and out of the cage. In most mining operations, there is a single cage tasked with the moving of all personnel and materials into and out of the underground levels. Due to this constraint, most mining operations must carefully plan the daily utilization of the cage in order to manage this bottleneck step. There are conditions which exist in an underground mine which affect the cage's schedule and can even restrict use of the cage. Examples of those conditions are:

The cage must be taken out of service during blasting;
The cage cannot be put back into operation until blast gasses and contaminants have had time to clear the mine;
The cage must be taken out of service during required rope and shaft inspections;
Unavailability of personnel or equipment for loading and unloading of materials on surface and underground; and
Materials at times need to be repackaged in order to accommodate the varying means by which it will be loaded into or out of the cage and the unique physics of each methodology.

Stage (4): Due to the dynamic and rapidly evolving mine conditions, endless planning, coordination and fulltime staff are required to coordinate material flow. Forecasting the schedule of the cage, the surface material coordinator moves the materials from surface staging to a queue for the cage in chronological order for transport to an underground level. In the event of a blast or blast gas clearance sequence, the material delivery to underground is delayed.

Stage (5): Either the cage tender or an underground material coordinator removes the materials from the cage and transports it to either the point of use or an underground staging area typically by utilizing mobile equipment. Underground staging areas range from formalized warehouses with shelving to lay down areas located throughout the mine. Underground staging areas are dynamic and can be implemented spontaneously based on demand with little to no documentation. This leads to materials in underground inventory being untracked and poorly managed. Overstock and supplies lost in transit plague most underground mining operations. In addition, some overstock materials are often written off due to the cost of coordinating the removal and return transportation to surface. Documentation of underground inventory is typically a manual task which relies on the individual relocating the materials to account for changes.

Stage (6): Facilitation of the transportation of materials from underground staging to point of use is typically the responsibility of the end user. Due to many consumers drawing from underground staging with little to no documentation, the underground staging inventory can only be managed by minimum on hand quantities and persistent conscientious support.

In contrast, the present invention discloses a system for the delivery of materials in a mine from surface, down the shaft, and to the working face, using integration of various mine software systems (e.g. mine planning software, maintenance planning software, Enterprise Resource Planning (ERP) systems, tracking software, and others).

Several objects and advantages of the present invention are:

a. to reduce overall mining costs, increase mine productivity and face utilization;
b. to lower the inventory of consumables during mine shutdown;
c. to reduce material handling labour costs;
d. to lower hoist and cage energy and maintenance costs;
e. to reduce waste of consumables;
f. to improve worker safety;
g. to facilitate just-in-time delivery of materials; and
h. to help mines meet production targets.

The present invention has the following components:

1. Integration of Software Platforms

Every mine operates on an array of software platforms to keep it functioning. These can include mine planning, maintenance planning, procurement and inventory management systems. Typically, these software systems are used independently. The present invention integrates various mine software systems (e.g. mine planning software, maintenance planning software, Enterprise Resource Planning (ERP) systems, tracking software, and others).

According to the present invention, mine systems are seamlessly integrated allowing for improved coordination for material ordering and better tracking of inventory levels.

2. Supporting Technological Infrastructure

To gain better visibility into the underground mine and to accurately track material delivery and consumption, some supporting technological infrastructure is required, including a mine-wide wireless communication system and material tracking system.

3. Material Delivery

The following components are part of the material delivery system:

Remotely controlled vehicles or Payload Autonomous Carriers (or PACs): PACs are automated guided vehicles that autonomously deliver material throughout the mine. PACs may be of varying sizes. Mini-PACs are smaller in size and capacity compared to full size PACs.

Tagged Containers: These are containers in which material is placed inside of for transport during delivery. They are equipped with tagging technology to have the ability to track material through the delivery process; and with smart technology to enable real-time edge processing functionality, onboard computing to allow real-time analytics, edge processing and network connectivity. These tagged containers are also referred to as "smart containers" or "smart cubes". Because all material is stored in "smart cubes", they can easily be stacked, optimizing the cage's capacity.

"Smart Distribution Centre": where "smart cubes" are filled with materials after which PACs can transport them to the cage for delivery. Smart Distribution Centre replaces a traditional large warehouse currently used by most mines.

The present invention utilizes just-in-time delivery and tracking system, as such a traditional large warehouse to stock products is no longer required. Products will arrive from suppliers as needed.

In accordance with the present invention, there is provided an automated material procurement, storage, inventory and delivery system for underground mines.

The invention comprises means for procuring and receiving consumable material from suppliers in a designated receiving area or smart distribution centre.

The invention further comprises means for determining the required consumable material.

The received material is primarily in a containerized or palletized form. The material is retrievably stored in an automated warehouse.

Means for receiving material includes means for electronically identifying delivered material and electronically tracking the location of delivered material in real time.

Identification means may be a bar code means, or a RFID tag means.

An automated warehouse may be located in close proximity to the cage. Alternatively, there may be a plurality of warehouses on or in close proximity to the mine site, each adapted to store specific consumables.

Stored material may be bulk-stored, binned, containerized or palletized depending on the nature of the material.

Once material is received from the supplier, integrated software system is used to determine the optimal containerization and storage method.

To move material into and out of the warehouse, the present invention uses a plurality of remotely controlled vehicles or Payload Autonomous Carriers (PACs).

The invention further comprises automated and paperless means for receiving and processing customer orders including means for prioritizing the orders and means for automatic inventory control and replenishment. Included in means for inventory control is automatic means for matching inventory with mine production targets so that sufficient material is available for consumption to meet mine production targets.

Additionally, the invention comprises means for optimizing cage arrival and departure schedules wherein said schedules are a function of material delivery priority. The invention also ensures optimized stacking of the smart containers (or "smart cubes") to maximize the cage's capacity.

The invention includes means for efficiently loading and unloading the cage in a minimal amount of time.

A designated staging or receiving/queuing area is provided near the cage area.

As well, the invention interfaces with cage control means to ensure that the cage remains controlled during the loading operation. Controlled parameters include the doors, cage leveling means and cage locking means. Means for loading and unloading the cage include PACs specifically designed to efficiently move material, stored within the "smart cubes", into and out of the cage.

To permit the efficient distribution of material within the mine, the invention comprises means for delivering material to the customer at the mine working areas and confirming the delivery. Material staging areas may be located on each working level of the mine. When ordered material is delivered to a working level of the mine, it may be placed in a staging area for subsequent distribution to the working areas of the mine or it will be immediately brought to the working area.

The invention utilizes software and can be made accessible to clients anywhere in the mine using a communication network.

Orders for consumable materials are placed at one of a plurality of system access stations or terminals located throughout the mine. A person skilled in the art would understand that a terminal may encompass desktop, laptop, tablet, mobile phone, and other similar devices.

The orders are entered, processed and dispatched by a central processing unit.

Using a software system, the PACs locate and gather the required material from the warehouses and deliver the material to the cage loading staging area.

The gathered material is containerized, in a "smart cube", or palletized so that the PAC can quickly load the cage.

The software features an easy to operate graphic user interface for the ordering, tracking and management of consumable material. Command control and communications means is included so that the movement of PACs and material may also be controlled, tracked and monitored at any time.

The invention interfaces with cage controls and logic so that cage leveling and door controls may be operated by the system logic during cage loading and unloading sequences so that the PAC can enter and leave the cage.

Since the present invention operates in a mine environment, work safety will be an overriding feature. Numerous safety features are included to protect workers. For example, the invention can be used to identify and track workers throughout the mine. As well, the automated nature of the invention means that workers, moving vehicles and suspended loads do not have an opportunity to interact.

According to the present invention, real-time scanning of environmental conditions underground, even at the working face, and relays the information to the central control room or ventilation control system are also available. For example, as PAC is making deliveries throughout the mine, it can scan the mine for up-to-date data of the mine layout and developments which can then be fed back to the mine planning system.

According to the present invention, PACs and/or mini-PACs can extend the wireless network and provide Wi-Fi to the workers at the working face thus allowing them to stay connected at all times.

According to the present invention, as a PAC continues to deliver products, it may run into an electric vehicle which may need a boost. The PAC can give the electric vehicle a charge which will provide the electric vehicle enough power to get to a charging station.

To help eliminate mine waste, PAC can also pick up leftover material in "smart cubes" and return them to the smart distribution centre, or to a different section of the mine as required. Any unused material is logged in the ERP, which also tracks material arriving from suppliers and material sent to the mine. This helps to keep the mine on top of material management.

Figure 2:
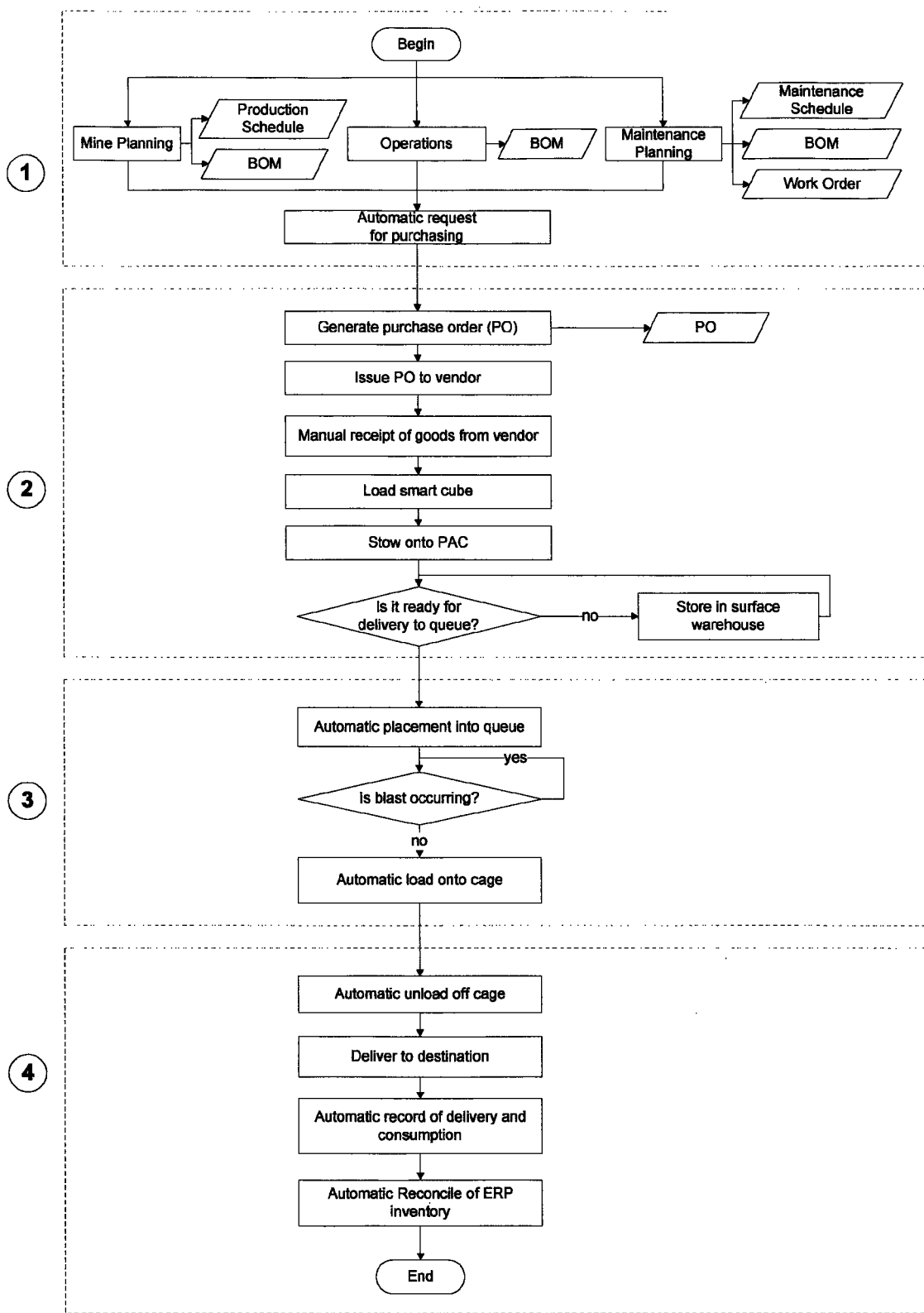
FIG. 2 shows the flowchart of the material delivery methodology in accordance with the present invention.

FIG. 2 shows the flowchart of the methodology of material delivery in mines in accordance with the present invention:

Stage (1): An official request for equipment, components or consumables is generated by any stakeholder with the appropriate security clearance and access to the network via computer or mobile device. A record of the request is registered in a database software such as an ERP (Enterprise Resource Planning). The ERP software facilitates the workflows to initiate the procurement of the materials and scheduling of work in the corresponding maintenance or operations schedule. The invention provides a communication link or interface between the Planning, Maintenance or Operations' software with the ERP software.

Stage (2): The procurement department generates and issues a purchase order to the appropriate vendor. The vendor then prepares the shipment by packaging the materials for shipment to the client's site by surface transportation (e.g. trucks on public highways). At this stage, vendors can opt to pre-package materials into "smart cubes". The embedded smart system on the "smart cubes" allows the "smart cubes" to act as a mobile inventory management system. Once materials arrive on the client's site, it will be unloaded from the trucks by mine personnel and loaded into "smart cubes"; if not already. During this process, the materials and corresponding "smart cubes" serial number will be registered to the system.

In the event the material is in immediate demand, it may be autonomously transported by PAC and placed directly into cage queue. Otherwise, the loaded and registered "smart cubes" can be relocated to surface staging either by personnel utilizing mobile equipment or autonomously by PAC. The "smart cubes" are stowed onto PACs when ready for transport. PAC is equipped with integrated sensors and instrumentation allowing it to gather real-time data during travel. It continuously relays information to the ERP and the overall system.

Surface staging areas range from: warehouses, cold storage facilities, lay down areas and inside the headframe directly adjacent to the cage. PACs will be equipped to autonomously self-deploy into efficiently configured holding patterns in stacked formations. This negates the need for shelving or personnel with forklifts. Surface inventories will be managed by the system control network's database of registered materials. This inventory data can be accessed by any stakeholder with network access via computer or mobile device. The point of use information for that material will be entered for the corresponding material to predetermine the forecasted date, time and location of use. This information can be updated at any time in order to dynamically and automatically change the autonomous deployment strategy of the "smart cubes".

Stage (3): With the date, time and location information in the system, PACs will autonomously stage in a chronological holding pattern ready to load themselves onto the cage. When the cage is not in use by mine personnel, it will be switched to autonomous mode. In autonomous mode, the system will commandeer the cage for autonomous material deployment. This function will automatically develop a deployment strategy and execute cage deliveries of PACs with the "smart cubes" stowed onto them to the corresponding mine levels. Cage retrofits will be implemented to accommodate large or incompatible materials not suitable for PAC stowed transportation in the cage. If PACs are not implemented, a work instruction can be automatically and dynamically fed to surface material coordinators to modify the cage queue.

During blasting or other cage restricted events, the cage will simply be switched to manual mode and all autonomous cage functions will halt. Immediately following a blast event, the PACs and the "smart cubes" can continue with delivery; even during blast gas clearing sequences.

Stage (4): Once the cage reaches the strategic level, the PAC will unload itself from the cage and autonomously navigate the mine environment to the location of point of use. If PACs are not implemented, a work instruction can be automatically and dynamically fed to underground material coordinators to modify the deployment strategy instructions. The PAC will then deploy the "smart cubes" in the location of point of use ready for immediate access by the end user. The PAC is now free to either return to the cage for transportation to surface or engage in another objective. If PACs are not implemented, the "smart cubes" will detect the relocation to the end users site and automatically update the underground inventory data on the control network.

There are many features that a PAC may be equipped with:

As PAC is making deliveries throughout the mine, it is scanning the mine for up-to-date data of your mine layout and developments. It also comes equipped with environmental sensors that will provide real-time information on air quality; even at the working face. This data will be used with a ventilation control system to ensure proper ventilation.

PAC may also be equipped with collision avoidance sensors. Mines are equipped with different vehicles and traffic can become an issue. The collision avoidance sensors mean that it can move out of the way of oncoming traffic.

To help eliminate mine waste, PAC can also pick up left over material in "smart cubes" and return them to the smart distribution centre or to a different section of the mine as needed. Any unused material is logged in the ERP which keeps tracks of material arriving from suppliers and material sent to the mine. This helps keep the mine on top of material management.

The present invention increases the overall productivity and safety of the mine, deliver material during off hours and reduce waste.

The present invention integrates the use of proximity identification technology which does not require personnel to execute and therefore can provide up to the minute material state data without human intervention.

The present invention also optimizes the dispatch and utilization of mine transport equipment and conveyance in order to facilitate material transport rather than the passive tracking of uncontrolled material distribution.

The present invention integrates a material management system to a vehicle dispatch system in order to guide autonomous vehicles for the just-in-time delivery of materials to strategic locations throughout the mine, while avoiding other mine vehicle traffic and hazards.

The present invention addresses the material management and physical delivery of materials to the site for maintenance on a just in time basis synchronized with the mine maintenance schedule.

The present invention not only tracks inventory and material delivery in real time, but provides the means for autonomous delivery of materials to the end user.

Although the present invention has been described in considerable detail with reference to certain embodiments thereof, other embodiments and modifications are possible. Therefore, the scope of the appended claims should not be limited by the embodiments set forth in the examples, but should be given the broadest interpretation consistent with the description as a whole.

The invention claimed is:

1. An automated material inventory and delivery system for use in an underground mine with a shaft and hoist elevating device, said system comprising:
   at least one terminal configured to place an order for consumable material, wherein the at least one terminal is accessible to a wireless network and located in the mine;

a central processing enterprise resource planning (ERP) unit configured to process the order for the consumable material received via the wireless network from the at least one terminal;

at least one smart cube configured to receive the consumable material from at least one supplier, wherein, the consumable material and a serial number for the at least one smart cube are registered to the ERP unit, the at least one smart cube is stored in a warehouse and equipped with Wi-Fi connectivity for connecting to the wireless network, and the at least one smart cube is equipped with tagging technology configured to track the consumable material via the ERP unit through a delivery process, wherein the tagging technology enables real-time processing functionality for mobile inventory management;

at least one payload autonomous carrier (PAC) configured to:

automatically collect the at least one smart cube and deliver the at least one smart cube to a mine cage;

automatically load the at least one smart cube into the mine cage;

automatically unload the at least one smart cube from the mine cage;

control operations of the mine cage, via communication through the ERP unit;

autonomously deliver the at least one smart cube to a predetermined working area inside the mine;

scan, in real-time during travel using integrated sensors and instrumentation, layout and developments of the mine and relay the scanned information to the ERP unit via the wireless network;

provide tracking of movement to the ERP unit via the wireless network; and extend the wireless network inside the mine.

2. The system of claim 1, wherein the mine cage is further used to transport containerized ore to surface of the mine.

3. The system of claim 1, wherein the ERP unit is further configured to: receive and process customer orders, prioritize the customer orders, and provide automatic inventory control and replenishment.

4. The system of claim 1, wherein the ERP unit is further configured to optimize arrival and departure schedules, wherein said schedules are a function of material delivery priority.

5. The system of claim 1, wherein the ERP unit is further configured to optimize cage logic.

6. The system of claim 1, wherein the PAC is equipped with at least one collision avoidance sensor.

* * * * *